Patented Jan. 30, 1940

2,188,777

UNITED STATES PATENT OFFICE 2,188,777

PREPARATION OF 2-KETO ALDONIC ACIDS FROM ALDONIC ACIDS

Richard Pasternack, Brooklyn, N. Y., and Peter P. Regna, North Bergen, N. J., assignors to Charles Pfizer & Company, Brooklyn, N. Y., a corporation of New Jersey No Drawing. Application December 24, 1938, Serial No. 247,644

7 Claims. (Cl. 260—535)

The object of this invention is the preparation of 2-keto aldonic acids from the corresponding aldonic acids by a catalytic chemical oxidation.

It is known to prepare 2-keto gluconic acid from gluconic acid by means of an oxidative fermentation (Bernhauer and Görlich, Biochem. Z. 280:367-74 (1935)). However, this appears to be a specific reaction and there is no evidence that it is applicable to other aldonic acids.

Since the molecule of an aldonic acid contains many points of attack, it is obvious that chemical oxidizing agents must be highly selective in their action if they are to dehydrogenate only the second carbon atom.

We have now found that chlorates in the presence of vanadium as catalyst produce the desired result. When this oxidizing combination acts upon free aldonic acids—or rather upon their equilibrium mixtures of acid and lactone—the recovery of 2-keto acid is relatively small. However, substantially better yields are obtained when soluble aldonates are treated in a mildly acid medium. Suitable acidifying agents are small amounts of mineral acids, or organic acids which are stable toward chlorates in the presence of vanadium. We prefer to adjust the acidity to a pH between 3 and 4, and it is desirable to maintain it within this range by the use of sodium acetate or sodium phosphate buffers.

The amount of vanadium which is added is not critical. About 2% of the weight of aldonate present is an adequate proportion. While this reaction proceeds well at room temperature, the rate of reaction is increased by raising the temperature, although it is not desirable to heat the mixture above 60° C.

Oxidation is complete when the solution changes from yellow to blue due to the formation of vanadyl compounds. The vanadium can then be separated as an insoluble precipitate by the addition of barium or calcium ferrocyanide. A simple method of isolating the salts of the 2-keto acids from the vanadium-free solution is by fractional precipitation by alcohol. The 2-keto acid formed may be determined by means of a Fehling's solution which has been standardized against the particular 2-keto acid.

The following aldonates have been oxidized by the new process: gluconates, idonates, gulonates, galactonates, arabonate.

Example 1

The oxidation of sodium-d-gluconate to sodium 2-keto d-gluconate.

109 grams of sodium gluconate and 18 grams of sodium chlorate are dissolved in about 500 cc. of water. To this solution 50 cc. of acetic acid and about 4 grams of vanadium pentoxide are added. The mixture is stirred for a time and then allowed to stand. After about 40 hours—the time is dependent on the acidity, concentration and temperature of the reaction mixture—the brown vanadate salts are converted to the blue vanadyl compounds indicating the completion of the oxidation.

The insoluble vanadium pentoxide is removed by filtration, and the filtrate treated with small amounts of calcium ferrocyanide solution until the blue color of the solution disappears. The precipitated vanadium ferrocyanide compound is filtered, and the calcium ions in the filtrate are completely removed with oxalic acid. An analysis by Fehling's reduction method indicates a 50% yield of theory calculated as 2-keto-gluconic acid.

The clear filtrate is then evaporated to dryness under diminished pressure. The residual sirup is taken up with about 200 cc. of methyl alcohol containing 20 grams of hydrochloric acid. This amount of hydrochloric acid precipitates the sodium ions as sodium chloride, whereupon the latter is subsequently filtered. The alcoholic solution now contains the free organic acids in a concentration of about 1% hydrochloric acid to catalyze the esterification.

After about 24 hours standing the crystallized methyl 2-keto-d-gluconate is recovered. Upon recrystallization from methyl alcohol it has a melting point of 174–175° C., and a specific rotation at equilibrium $[\alpha]_D = -76.8°$ ($c=2.8$) (Ohle, Berichte 63:843–50, 1930). The recovered 2-keto-d-gluconic methyl ester is converted to isoascorbic acid by the method of Maurer and Scheidt (Berichte, 67:1239–41, 1934). The pure recovered isoascorbic acid has a melting point of 166° C., and its specific rotation is $[\alpha]_D = -17.7°$ ($c=10$).

Example 2

The oxidation of sodium l-idonate to sodium 2-keto-l-idonate.

109 grams of sodium idonate, 18 grams sodium chlorate, 3 grams vanadium pentoxide, and 5 cc. of phosphoric acid 85% are reacted in 500 cc. of water. After standing about 40 hours the blue color due to the vanadyl compound appears. At this time the insoluble vanadium pentoxide is filtered, and the blue colored filtrate is treated with sufficient solid barium ferrocyanide to precipitate the vanadium and then filtered. Zinc sulfate is added to the filtrate for the removal of ferrocyanide, phosphate and barium ions. The precipitate thus formed is filtered and washed; and the filtrate analyzed by Fehling's reduction method. The determination shows the yield to be 60% of theory calculated as 2-keto-idonic acid.

The clear filtrate is then concentrated under diminished pressure until it contains about 200 cc. of water. It is warmed to about 40° C., and 475 cc. of methyl alcohol is added to make the solution 70% by volume with respect to the alcohol. There is an immediate crystallization of sodium 2-keto-l-idonate from this solution, which can be filtered at once. The dried sodium 2-keto-l-idonate contains one molecule of water and is identical with sodium 2-keto-l-gulonate. The physical constants of the recovered salt agree with those reported by Micheel, Kraft & Lohmann (Z. Physiolog. Chemie 225:13–27, 1934). Its melting point is 144–145° C. and its specific rotation at equilibrium $[\alpha]_D = -23.6°$ ($c = 10$).

This sodium salt may be converted to ascorbic acid in the following manner. The calculated amount of sulfuric acid is added to a solution of this salt, and the solution evaporated to dryness under diminished pressure. The dry residue is diluted with methyl alcohol, and the insoluble sodium sulphate filtered. The alcoholic filtrate is treated with 1½% of its weight of hydrochloric acid gas and refluxed at atmospheric pressure for 2 hours. Upon subsequent evaporation, the 2-keto-l-idonic methyl ester crystallizes easily. The recovered ester melts at 155–156° C. (Reichstein and Grüssner, Helv. Chim. Acta 17:311–28, 1934). 20 grams of this ester is suspended in 60 cc. of methyl alcohol at 45° C., 5% over the theoretical amount of sodium methylate is added, and the mixture heated at 40–45° C. for 10 minutes. The mass is then cooled and the calculated amount of sulfuric acid added. The insoluble sodium sulphate is filtered, and the filtrate evaporated. The concentrated solutions crystallized readily upon the addition of a few crystals of ascorbic acid. The material obtained in this way has the known physical constants of l-ascorbic acid, melting point = 189–191° C. and a specific rotation $[\alpha]_D = +21°$ ($c = 10$).

Example III

The oxidation of sodium l-gulonate to sodium 2-keto-l-gulonate.

A solution containing 21.8 grams of sodium-l-gulonate in 100 cc. of water is treated with 20 cc. of acetic acid, 5 grams of sodium acetate, ½ gram of vanadium pentoxide and 3.6 grams of sodium chlorate. This mixture is allowed to stand at room temperature until it turns blue, which requires about 20 hours. A small amount of insoluble material is filtered, and the filtrate treated, as described in Examples 1 and 2, for the removal of the vanadyl ions. On analyzing the clear filtrate by Fehling's reduction method, the yield is 68% of theory calculated as 2-keto gulonic acid. The solution is then concentrated under diminished pressure to a volume of about 100 cc. It is warmed and subsequently diluted with methyl alcohol to make the solution 70% with respect to the alcohol. The sodium 2-keto-l-gulonate dihydrate crystallizes immediately. Its physical and chemical properties are identical with sodium 2-keto-l-idonate dihydrate given in Example 2.

Example IV

The oxidation of sodium d-galactonate to sodium 2-keto-d-galactonate.

25.4 grams of sodium galactonate dihydrate is dissolved in 100 cc. of water and to this is added 1 cc. of phosphoric acid (85%), 2 grams sodium diacid phosphate, ½ gram of vanadium pentoxide and 3.6 grams of sodium chlorate. The mixture is allowed to stand until a blue color appears in the solution. It is then filtered and the vanadyl ions removed as described in Examples 1 and 2. On analyzing by Fehling's reduction method, the yield is 33% of theory calculated as 2-keto-galactonic acid. The extraneous ions are removed as outlined in Example 2.

The solution is concentrated and diluted with about one part of methyl alcohol and the solution is stirred. The crystalline material which is recovered is largely unreacted sodium galactonate, and this is removed by filtration. The filtrate is evaporated under diminished pressure for the removal of the alcohol. The solution is analyzed for sodium and the calculated amount of sulphuric acid added to combine with the sodium. The chloride ions are then removed by the addition of silver oxide, and the silver chloride precipitate is filtered. The filtrate is then evaporated to dryness and taken up with alcohol, whence the insoluble sodium sulphate is removed. The alcoholic filtrate is evaporated under diminished pressure to dryness, and the residual sirup is dissolved in water. The aqueous solution is neutralized with brucine. The solution is evaporated to dryness and taken up with a small amount of methyl alcohol. After about 48 hours standing crystallization takes place.

The recovered brucine salt was recrystallized three times from 90% acetone. The final crystallization possesses the specific rotation $[\alpha]_D = -25.0°$ ($c = 1.2$ in water), and corresponds to brucine 2-keto-d-galactonate trihydrate $C_{23}H_{26}O_4N_2 \cdot C_6H_{10}O_7 + 3H_2O$, as reported by Kitasato (Biochem. Z. 207:215–229, 1929). A small portion dried in vacuum at 60° C. has a melting point of 175° C., which is in agreement with that obtained by Kitasato on the anhydrous salt.

The invention claimed is:

1. Process for the preparation of 2-keto-aldonic acids by the action of a member of the group consisting of alkali metal and alkaline earth metal chlorates upon a member of the group consisting of aldonic acids and soluble aldonates in the presence of a vanadium catalyst and in a mildly acid medium.

2. Process for the preparation of 2-keto aldonates by the action of a member of the group consisting of alkali metal and alkaline earth metal chlorates upon soluble aldonates in the presence of vanadium as a catalyst and in a mildly acid medium.

3. Process for the preparation of 2-keto gluconates by the action of a member of the group consisting of alkali metal and alkaline earth metal chlorates upon soluble gluconates in the presence of vanadium as a catalyst and in a mildly acid medium.

4. Process for the preparation of 2-keto idonates by the action of a member of the group consisting of alkali metal and alkaline earth metal chlorates upon soluble idonates in the presence of vanadium as a catalyst and in a mildly acid medium.

5. Process for the preparation of 2-keto gulonates by the action of a member of the group consisting of alkali metal and alkaline earth metal chlorates upon soluble gulonates in the presence of vanadium as a catalyst and in a mildly acid medium.

6. Process for the preparation of sodium 2-keto idonate by the action of sodium chlorate upon sodium idonate in the presence of vanadium as a catalyst and in a mildly acid medium.

7. Process for the preparation of 2-keto aldonates by the action of a member of the group consisting of alkali metal and alkaline earth metal chlorates upon soluble aldonates in the presence of vanadium as a catalyst and a sufficient quantity of buffer to maintain the pH between 3 and 4.

RICHARD PASTERNACK.
PETER P. REGNA.